May 2, 1944.　　　　　W. E. SMITH　　　　　2,347,646

METALLIC ARC WELDING NOZZLE

Filed March 21, 1942

INVENTOR.
WILLIAM E. SMITH.
BY
ATTORNEY

Patented May 2, 1944

2,347,646

UNITED STATES PATENT OFFICE 2,347,646

METALLIC ARC WELDING NOZZLE

William E. Smith, Detroit, Mich., assignor to The Midland Steel Products Company, Cleveland, Ohio, a corporation of Ohio Application March 21, 1942, Serial No. 435,663

8 Claims. (Cl. 219—8)

This invention relates to new and useful improvements in metallic arc welding nozzles of the type employed for automatically feeding bare or dust-coated fusible welding wire to be fused and deposited in the seam being constructed.

An important object of the invention is to provide an improved electrical conductor or contact for the electrode which is adjustable in several ways to compensate for the excessive wear imposed thereon.

Another important object of the invention is to provide a nozzle having a passage for the automatically fed wire or electrode, an adjustable conductor and an insulated contact piece engaging opposite sides of the electrode whereby arcing is prevented and proper pressure is exercised upon the electrode by adjustment of either or both the conductor and contact pieces.

Other objects and advantages of the invention will become apparent during the course of the following description.

Figure 1:
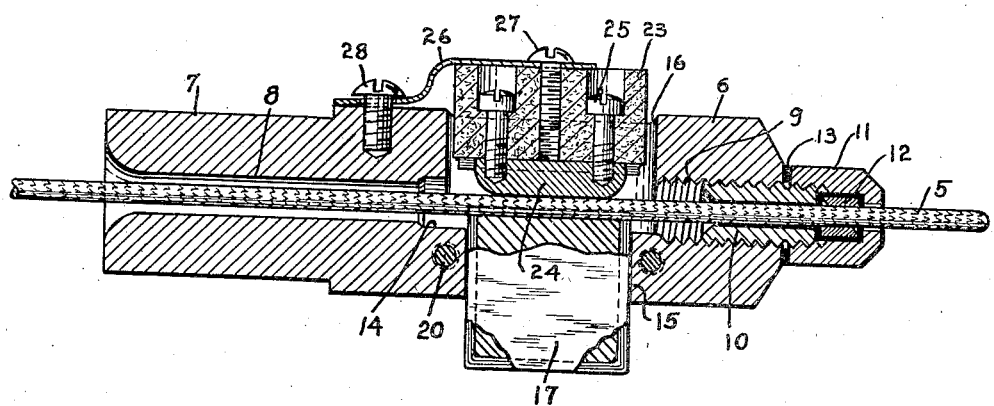
Figure 2:
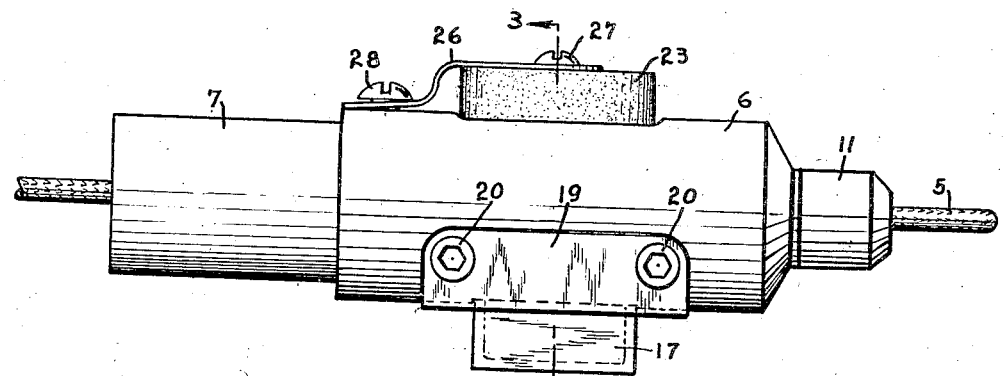
Figure 4:
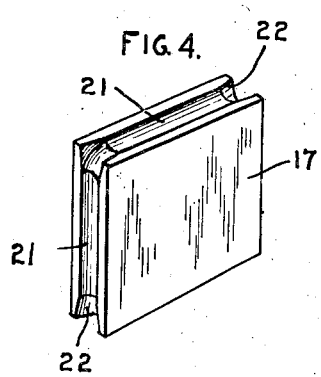
Figure 3:
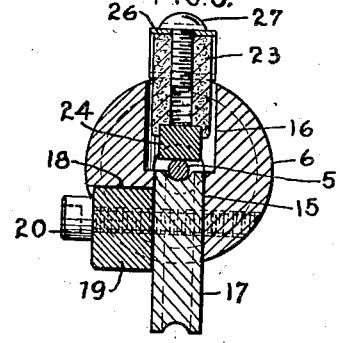

In the accompanying drawing forming a part of the application and wherein like numerals are employed to designate like parts throughout the several views, Fig. 1 is a longitudinal section of the improved welding nozzle showing the position of the fusible electrode or wire therein, Fig. 2 is a side elevation of the improved nozzle, Fig. 3 is a transverse section of the same taken on the line 3—3 of Fig. 2, Fig. 4 is a perspective view of the improved reversible and adjustable conductor piece employed in conjunction with the nozzle.

Referring now more particularly to the drawing, wherein for the purposes of illustration is shown one of the preferred forms of the invention, the numeral 5 designates an electrode in the form of bare or dust-coated fusible weld wire usually delivered to the welding nozzle 6 from a reel, not shown, from whence it is delivered to power driven feeding rolls, not shown, which positively feed the wire through the nozzle as required. While some of this wire has a smooth exterior, one type used extensively has its exterior surface knurled or provided with indentations to facilitate feeding and electrical contact, but in either event, when used in high speed welding, travels through the nozzle comparatively fast and has somewhat the effect of a rat-tail file upon the parts with which it contacts, with consequent rapid wear imposed thereon. It is therefore an important object of this invention to provide means for readily compensating for wear upon the exposed parts, retarding such wear wherever possible, and insuring good electrical contact while preventing detrimental arcing between the electrode and susceptible parts. This latter object is accomplished by providing only one live conductor and insulating the pressure piece from the nozzle.

One end 7 of the nozzle 6 is of reduced section to be clamped in a suitable welding head equipped with means for positively feeding the wire 5 through the nozzle. This nozzle is provided with a longitudinally extending bore 8 larger than the diameter of the wire 5 and at its discharge end is enlarged and threaded as at 9 for the reception of an externally threaded sleeve or nipple 10 having a longitudinal passage with slight clearance for the passage of the weld wire. One end of this nipple extends beyond the end of the nozzle to receive a tip 11 which is provided with a hardened wear resisting ring 12 which is entirely insulated from the tip and nipple as disclosed in my Letters Patent 2,289,938, dated July 14, 1942. If desired, an insulating washer 13 is interposed between the end of the nozzle 6 and the welding tip 11 as best shown in Fig. 1. As herein illustrated, the nozzle 6, nipple 10 and tip 11 are constructed from an electrical conducting material such as copper, or these may be made entirely of hard electrical insulating material.

An intermediate portion of the bore 8 is enlarged as at 14 where electrical contact is made by a single conductor with the welding wire 5. A rectangular opening 15 is cut or milled transversely and diametrically through the nozzle at its enlarged bore portion from one side of the nozzle all the way through to its opposite side where it is enlarged into a larger rectangular opening 16. Consequently, both of these openings 15 and 16 communicate and extend laterally from the enlarged portion 14 of the bore as illustrated and open on the exterior of the nozzle. Within the opening 15 is slidably and adjustably mounted an equi-lateral rectangular conductor piece or block 17 of good electrical conductivity, such as copper or copper alloy. To this conductor may be secured, in any suitable manner, the lead of an electrical current. A segment of the cylindrical nozzle 6 is chased out to form a lateral recess 18 exposing one broad side of the opening 15 whereby a clamping block 19 extending slightly beyond, may be firmly clamped in engagement with a broad side of the conductor 17 by means of a pair of screws 20 threaded into the nozzle beyond opposite ends of the slot 15. Of course the conductor is of a width to project into the recess 18 to be engaged and clamped by the block 19. By loosening the screws 20 and the block 19 the conductor may be bodily slid or adjusted radially with respect to the bore in the nozzle to compensate for wear to a degree equal to practically the entire extent of the conductor 17. Until this conductor is practically worn out, one end thereof extends laterally a substantial distance of the nozzle 6 for accessibility and easy adjustment. The end of the conductor 17 which is disposed within the enlarged portion 14 of the bore of the nozzle is adjusted so that it engages one side of the weld wire 5 and supports a portion of the weld wire axially of the bore in spaced relation to the walls thereof. Each of the four ends or sides of the conductor 17 is provided with a groove 21 extending longitudinally of its respective side with opposite ends 22 flared outwardly to assist in guiding the welding wire into and out of engagement with the conductor. Since the conductor block 17 is equi-lateral or square, all four of its sides are exactly the same size to slidably fit the rectangular opening 15 in the nozzle so that anyone of its four sides or ends may be engaged with the weld wire to present a fresh groove 21 thereto without requiring the time necessary for redressing one of its contact portions. By simply loosening the screws 20 and clamping block 19, the conductor block 17 can be removed from its opening, turned to present a different end or side to the weld wire and reinserted in the opening without loss of time. When one side is not worn sufficiently to require presentation of a new groove, the conductor block 17 may be adjusted lengthwise into the nozzle to compensate for wear as it occurs. Any of the other three unused or exposed grooves not being used to engage the electrode, may be employed for clamping a conductor wire to the block.

In order to maintain the weld wire 5 in good electrical contact with the conductor 17, an insulated pressure pad or contact piece 23 is mounted in the lateral opening 16 and is provided with a hardened wear resisting metallic contact shoe 24, removably secured in a groove in the piece 23 of insulating material by means of the pair of screws 25, as clearly described in my aforesaid Letters Patent. This hardened shoe 24 firmly presses the weld wire 5 into good electrical contact with the adjustable conductor 17, and being insulated to eliminate arcing, the only wear is from abrasion. The pressure pad 23 is floatably or spring supported within the opening 16 with clearance around all four sides and for this purpose a flat spring 26 is secured to the top of the pad 23 by means of a screw 27, while the opposite end of the flat spring is adjustably secured to the body of the nozzle 6 by means of a screw 28.

In order that the contact pad 23 and its hardened shoe may be tipped slightly longitudinally so that only one end of the shoe 24 may be pressed into contact with the weld wire 5, this shoe may be made thinner at one end than the other, or the two ends of the flat bowed spring or bracket 26 may be non-parallel as shown in Figs. 1 and 2, so as to cause only one end of the shoe 24 to engage the weld wire and a range of adjustment is provided. Such arrangements will prolong the serviceability of the shoe, as the piece 23 can be moved farther into the opening 16 by tightening the screw 28 to force the anchor end of the spring 26 closer to the nozzle as wear upon the shoe occurs. However, if it is desired that the entire length of the shoe contact entirely with the weld rod, the hardened shoe 24 or its retaining groove in the bottom of the pressure pad 23 may be made parallel with the contact surface of the conductor block 17 along with a parallel arrangement of the two ends of spring 26. In any event, the pressure piece 23 and shoe 24 will be spring urged against one side of the weld wire at all times to follow any springing or bowing of the weld wire 5 as it wears into the conductor block 17, thereby insuring efficient electrical contact at one point at all times. Or the pressure piece 23 may be fixed in position and all adjustments made by moving only the conductor 17 into the nozzle to force the wire against the pressure pad thereby placing its spring or bracket 26 under tension. If desired, the conductor piece 17 may also be fed in automatically as it wears by loosening the screws 20 or eliminating the clamping block 19 and providing a spring like 26 for the piece 17. Thus, the pressure pad 23 and conductor piece 17 can, in this way, be normally urged radially inward into engagement with opposite sides of the wire 5 to automatically compensate for wear. Or the pressure pad 23 may be held in fixed relation to the nozzle, and the spring 26 used to spring mount the conductor piece.

It will be understood that various changes in the size, shape and arrangement of parts may be resorted to without departing from the spirit of the invention or the scope of the appended claims.

I claim:

1. A metallic arc welding nozzle having a passage extending therethrough to slidably receive an electrode and a lateral opening extending transversely therefrom to the external surface of the nozzle, an elongated removable non-rotatable conductor piece extending exteriorly of the nozzle and being rectilinearly slidable lengthwise in said lateral opening to vary its frictional engagement with said electrode while engaged therewith, and means for securing said conductor piece in fixed adjusted position.

2. A metallic arc welding nozzle having an electrode passage therein and a lateral opening extending therefrom, and a reversible conductor reversibly and slidably mounted in said lateral opening and having opposite edges provided for selective engagement with said electrode.

3. A metallic arc welding nozzle having a passage therethrough to slidably receive an electrode and a lateral opening extending transversely from said passage, and an equi-lateral rectangular conductor removably mounted in said lateral opening in any one of several positions to present different edges to said electrode as the other edges wear.

4. A metallic arc welding nozzle having an electrode passage therein and a lateral opening extending therefrom, and a rectangular conductor reversibly mounted in said lateral opening in either of two different positions to present different edges thereof to said electrode as the other edges wear.

5. A metallic arc welding nozzle having an electrode passage therein and lateral openings extending in alignment from opposite sides thereof, a spring pressed insulated pressure pad in said nozzle opposite one lateral opening and engaging one side of said electrode, and a conductor bodily adjustably mounted in said other aligned lateral opening and engaging the opposite side of said electrode, said conductor being movable transversely of said passage to stress the electrode and spring pressed pad whereby the proper pressure may be exercised upon the electrode.

6. A metallic arc welding nozzle having an electrode passage therein and a lateral opening extending therefrom through the exterior surface of the nozzle, an adjustable conductor extending exteriorly of the nozzle and being adjustable lengthwise in said lateral opening to be frictionally engaged with said electrode in said passage, said nozzle having a recess exposing one side of said conductor, and a clamping block disposed in said recess to firmly hold the conductor in its adjusted position.

7. A metallic arc welding cylindrical nozzle having an electrode passage therein and a radial opening extending therefrom through the exterior surface of the nozzle, an adjustable conductor block extending exteriorly of said nozzle and being adjustable lengthwise in said radial opening to be frictionally engaged with said electrode, said nozzle having a segment chased out to expose one side of said conductor, and a clamping block disposed in said chased out segment to firmly hold the conductor in its adjusted position.

8. An arc welding nozzle having a passage therethrough to slidably receive an electrode and a lateral opening extending therefrom, and a conductor bodily insertable into said lateral opening in any of a plurality of positions to engage different portions thereof with said electrode as other portions of the conductor become worn.

WILLIAM E. SMITH.